United States Patent
Nagao

(10) Patent No.: US 10,395,109 B2
(45) Date of Patent: Aug. 27, 2019

(54) RECOGNITION APPARATUS, RECOGNITION METHOD, AND COMPUTER PROGRAM PRODUCT

(71) Applicant: Kabushiki Kaisha Toshiba, Tokyo (JP)

(72) Inventor: Manabu Nagao, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/679,238

(22) Filed: Aug. 17, 2017

(65) Prior Publication Data
US 2018/0137353 A1    May 17, 2018

(30) Foreign Application Priority Data
Nov. 17, 2016  (JP) .................................. 2016-224033

(51) Int. Cl.
*G06K 9/00* (2006.01)
*G06K 9/62* (2006.01)
(Continued)

(52) U.S. Cl.
CPC ......... *G06K 9/00503* (2013.01); *G06K 9/481* (2013.01); *G06K 9/6256* (2013.01);
(Continued)

(58) Field of Classification Search
None
See application file for complete search history.

(56) References Cited

U.S. PATENT DOCUMENTS 5,787,395 A * 7/1998 Minamino ............... G10L 15/08
   704/255
5,794,190 A * 8/1998 Linggard ................ G10L 15/08
   704/232

(Continued)

FOREIGN PATENT DOCUMENTS

| JP | 11-85180 | 3/1999 |
| JP | 2008-15120 | 1/2008 |
| JP | 2009-80309 | 4/2009 |

OTHER PUBLICATIONS

Sukkar et al., "Reducing Computation Complexity and Response Latency Through the Detection of Contentless Frames," Proc. of ICASSP (2000), 6:3751-54.

(Continued)

*Primary Examiner* — Marcus T Riley
(74) *Attorney, Agent, or Firm* — Finnegan, Henderson, Farabow, Garrett & Dunner, L.L.P.

(57) ABSTRACT

According to an embodiment, a recognition apparatus includes one or more processors. The one or more processors are configured to calculate, based on the input signal, a score vector sequence in which a plurality of score vectors each including respective scores of symbols are arranged; and cause, among: a first score vector in which a representative symbol corresponding to a best score is a recognition-target symbol; a second score vector in which a representative symbol is a non-target symbol, and a score of the representative symbol is worse than a first threshold; and a third score vector in which a representative symbol is a non-target symbol, and a score of the representative symbol is equal to the first threshold or better than the first threshold, a third score vector satisfying a predefined first condition, to pass through to filter the score vector sequence.

15 Claims, 7 Drawing Sheets

(51) Int. Cl.
*G06K 9/48* (2006.01)
*G10L 15/02* (2006.01)
*G10L 15/14* (2006.01)
*G06K 9/72* (2006.01)
*G10L 15/16* (2006.01)
*G06N 3/04* (2006.01)
*G10L 25/51* (2013.01)
*G10L 25/30* (2013.01)

(52) U.S. Cl.
CPC .......... *G06K 9/6274* (2013.01); *G06K 9/723* (2013.01); *G10L 15/02* (2013.01); *G10L 15/14* (2013.01); *G10L 15/16* (2013.01); *G06K 2209/01* (2013.01); *G06K 2209/21* (2013.01); *G06N 3/0445* (2013.01); *G10L 25/30* (2013.01); *G10L 25/51* (2013.01); *G10L 2015/025* (2013.01); *G10L 2015/027* (2013.01)

(56) References Cited

U.S. PATENT DOCUMENTS

| | | | | |
|---|---|---|---|---|
| 5,893,058 | A * | 4/1999 | Kosaka | G10L 15/12 704/254 |
| 6,078,884 | A * | 6/2000 | Downey | G10L 25/87 704/243 |
| 6,151,571 | A * | 11/2000 | Pertrushin | G10L 17/26 704/207 |
| 6,275,806 | B1 * | 8/2001 | Pertrushin | G10L 17/26 704/270 |
| 6,400,996 | B1 * | 6/2002 | Hoffberg | G05B 19/0426 370/218 |
| 6,574,595 | B1 | 6/2003 | Mitchell et al. | |
| 7,006,881 | B1 * | 2/2006 | Hoffberg | G05B 15/02 700/17 |
| 2001/0056349 | A1 * | 12/2001 | St. John | G07C 9/00158 704/270 |
| 2002/0002464 | A1 * | 1/2002 | Petrushin | G10L 17/26 704/275 |
| 2002/0010587 | A1 * | 1/2002 | Pertrushin | G10L 17/26 704/275 |
| 2003/0023444 | A1 * | 1/2003 | St. John | H04M 3/382 704/270.1 |
| 2008/0281595 | A1 | 11/2008 | Sakai et al. | |
| 2013/0138428 | A1 * | 5/2013 | Chandramouli | G06F 17/274 704/9 |
| 2016/0086600 | A1 | 3/2016 | Bauer et al. | |
| 2016/0210534 | A1 * | 7/2016 | Padubrin | G06K 9/48 |
| 2018/0121796 | A1 * | 5/2018 | Deisher | G06N 3/063 |
| 2018/0137353 | A1 * | 5/2018 | Nagao | G06K 9/6274 |

OTHER PUBLICATIONS

Chen et al., Phone Synchronous Decoding with CTC Lattice, Interspeech 2016 (Sep. 8-12, 2016), pp. 1923-1927.

Graves et al., "Towards End-to-Eng Speech Recognition with Recurrent Neural Networks," Proceedings of the 31st International Conference on Machine Learning (2014), pp. 1764-1772.

Tang, "Deep Learning using Linear Support Vector Machines," arXiv:1306.0239v4 (Feb. 21, 2015), pp. 1-6.

Miao et al., "Simplifying Long Short-Term Memory Acoustic Models for Fast Training and Decoding," ICASSP (2016), pp. 2284-2288.

Sukkar et al., "Reducing Computational Complexity and Response Latency Through the Detection of Contentless Frames," Proc. of ICASSP (2000), 6:3751-54.

Graves et al., "Towards End-to-End Speech Recognition with Recurrent Neural Networks," Proceedings of the 31st International Conference on Machine Learning (2014), pp. 1764-1772.

* cited by examiner

```
1    ξ ← ξ_initial, η ← 0, σ ← ε
2    for i from 1 to N
3        v ← extract_features(f_i)
4        s ← calc_scores(v)
5        σ_prev ← σ
6        σ ← argmax s[a]
                a ∈ Σ
7        if σ = ε
8            if s[ε] < θ
9                ξ ← search(ξ, s)
10               η ← 0
11           else
12               if η = 1
13                   s_ε ← s
14                   r ← σ_prev
15                   η ← 2
16       else
17           if η = 2 ∧ r = σ
18               ξ ← search(ξ, s_ε)
19           ξ ← search(ξ, s)
20           η ← 1
21   return result(ξ)
```

RECOGNITION APPARATUS, RECOGNITION METHOD, AND COMPUTER PROGRAM PRODUCT

CROSS-REFERENCE TO RELATED APPLICATIONS

This application is based upon and claims the benefit of priority from Japanese Patent Application No. 2016-224033, filed on Nov. 17, 2016; the entire contents of which are incorporated herein by reference.

FIELD

Embodiments described herein relate generally to a recognition apparatus, a recognition method, and a computer program product.

BACKGROUND

There has been known a recognition apparatus that recognizes patterns of input signals, and converts input signal into a symbol sequence. For example, there have been known a speech recognition apparatus that recognizes speech signals, an optical character recognition (OCR) apparatus that recognizes characters from an image, and the like. In such recognition apparatuses, input signals are divided for each frame, and score calculation and symbol sequence search are performed for each divided frame.

Meanwhile, there exists a recognition apparatus that introduces a symbol representing that information included in an input signal is not a recognition target, and skips search processing when the score of the symbol is large enough. Because such a recognition apparatus skips processing for searching for a symbol that is not a recognition target, calculation costs can be reduced.

Nevertheless, in conventional recognition apparatuses, if symbols that are not recognition targets are skipped too much, a recognition rate declines in some cases.

BRIEF DESCRIPTION OF THE DRAWINGS

FIG. 5 is a diagram illustrating processing of deleting a recognition-target symbol of consecutive recognition-target symbols from the symbol sequence illustrated in FIG. 4;

FIG. 6 is a diagram illustrating processing of deleting symbols other than recognition-target symbols from the symbol sequence illustrated in FIG. 5;

DETAILED DESCRIPTION

Figure 1:
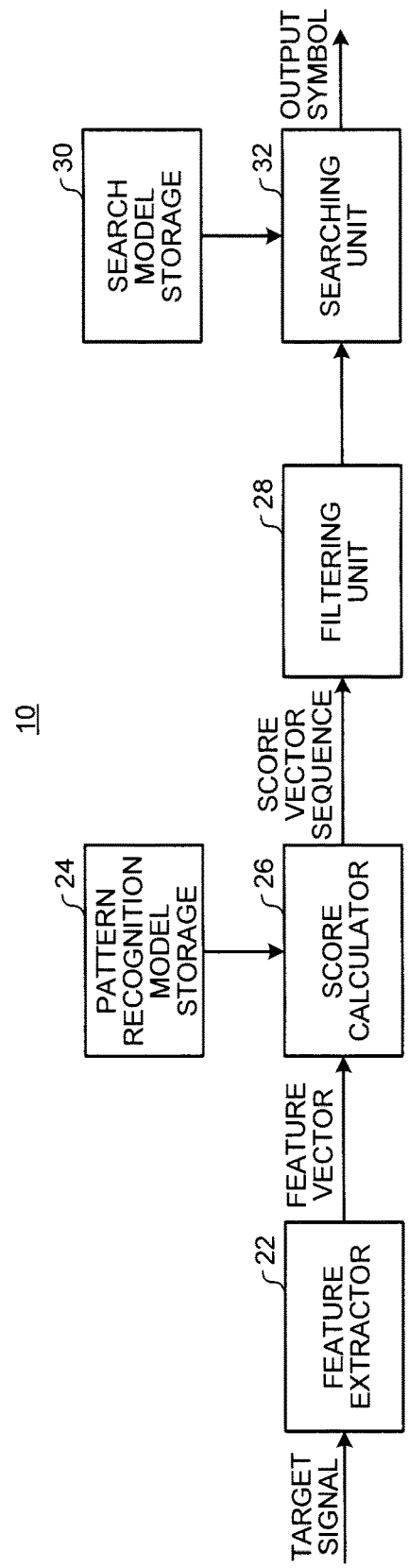
FIG. 1 is a diagram illustrating a configuration of a recognition apparatus according to an embodiment.

According to an embodiment, a recognition apparatus is for performing pattern recognition of an input signal being a recognition target. The recognition apparatus includes one or more processors. The one or more processors are configured to calculate, based on the input signal, a score vector sequence in which a plurality of score vectors each including respective scores of symbols are arranged, and cause a partial score vector of the calculated score vector sequence to pass through to filter the score vector sequence. The one or more processors are configured to cause, among: a first score vector in which a representative symbol corresponding to a best score is a recognition-target symbol; a second score vector in which a representative symbol is a non-target symbol, and a score of the representative symbol is worse than a first threshold; and a third score vector in which a representative symbol is a non-target symbol, and a score of the representative symbol is equal to the first threshold or better than the first threshold, a third score vector satisfying a predefined first condition, to pass through to filter the score vector sequence.

An embodiment will be described in detail below with reference to the drawings. A recognition apparatus 10 according to the present embodiment accurately recognizes patterns of input signals with small calculation costs, and outputs a recognition result of the input signals.

The recognition apparatus 10 recognizes information represented by an input signal, and outputs a recognition result. The input signal may be any signal as long as the signal includes pattern-recognizable information. Examples of the input signal include a speech signal, a signal representing handwriting, an image signal representing a character, a moving image signal representing gesture such as sign language, and the like.

First of all, terms used in the embodiment will be described.

A symbol represents pattern-recognizable information included in an input signal. For example, when the input signal is a speech signal, the symbol represents acoustic information included in the speech signal.

In addition, the acoustic information includes linguistic information. The linguistic information included in the acoustic information is information representable by characters that is added to the speech signal by a speaker speaking a language. For example, the linguistic information included in the acoustic information is a phoneme, a syllable, phonemes combined for each mora, a sub-word, a character, a word, and the like. In the case of Japanese, the linguistic information may be kana. In addition, in the case of English, the linguistic information may be a phonetic symbol or an alphabet.

In addition, the acoustic information may include paralinguistic information and nonlinguistic information. The paralinguistic information is information unidentifiable from the linguistic information that is added to the speech signal by a speaker producing a sound. For example, the paralinguistic information is a filler indicating that a speaker is thinking, and the like. The nonlinguistic information is information representing features of a speaker that is included in the speech signal. For example, the nonlinguistic information is gender of the speaker, age of the speaker, physical features of the speaker, and the like.

In addition, the acoustic information may include silent information. The silent information is information representing a state in which none of the linguistic information, the paralinguistic information, and the nonlinguistic information is included in the speech signal (e.g., silence and noise).

A symbol set is a set constituted by symbols each serving as an element. The symbol set is predefined. The symbol set includes, as symbols, at least one recognition-target symbol, and a non-target symbol.

The recognition-target symbol is a symbol representing information to be recognized by the recognition apparatus 10, among pieces of information included in an input signal. For example, if the input signal is a speech signal, the symbol set may include, as recognition-target symbols, characters corresponding to all pieces of linguistic information that can be included in the speech signal (e.g., all phonetic symbols). In addition, if the recognition apparatus 10 recognizes only a specific word (e.g., recognizes only "good"), the symbol set may include, as recognition-target symbols, characters corresponding to linguistic information necessary for recognizing the specific word. In addition, when paralinguistic information, nonlinguistic information, and/or silent information are/is used as recognition targets, the symbol set may include, as one of recognition-target symbols, a symbol representing paralinguistic information, nonlinguistic information and/or silent information.

The non-target symbol is a symbol representing that it is undetermined which piece of information among information pieces represented by recognition-target symbols is included in an input signal. In other words, the non-target symbol is a symbol representing that the recognition apparatus 10 cannot recognize recognition-target symbols at the present stage. More specifically, the non-target symbol is a symbol representing that processing of a below-described score calculator 26 determining which recognition-target symbol is to have a good score is suspended. The score of the non-target symbol becomes better when the processing is suspended, and becomes worse when the processing is not suspended. Thus, as described below, when a good score is calculated for the non-target symbol when an input signal corresponding to one frame is input, the input signal sometimes corresponds to a part or all of recognition target information pieces.

A symbol sequence is a series of likely symbols obtained by recognizing an input signal. The recognition apparatus 10 may generate one symbol sequence for one input signal. In addition, the recognition apparatus 10 may generate M (M is an integer of two or more) symbol sequences for one input signal.

An output symbol represents a recognition result of an input signal. In the case of recognizing a speech signal, the output symbol may be a word, a character, a sub-word sequence, and the like. The output symbol is generated based on a recognition-target symbol included in a symbol sequence. The recognition apparatus 10 may generate a plurality of output symbols arranged in chronological order, from one symbol sequence. A plurality of output symbols arranged in chronological order is sometimes called an output symbol sequence.

FIG. 1 is a diagram illustrating a configuration of the recognition apparatus 10 according to the embodiment. The recognition apparatus 10 includes a feature extractor 22, a pattern recognition model storage 24, the score calculator 26, a filtering unit 28, a search model storage 30, and a searching unit 32.

The feature extractor 22 acquires a recognition target input signal. For example, the feature extractor 22 acquires a speech signal as an input signal.

The feature extractor 22 analyzes an input signal for each frame, and calculates a feature vector for each frame. The feature vector includes a plurality of types of feature amounts representing features of information included in the input signal. For example, when the input signal is a speech signal, the feature vector includes a plurality of types of feature amounts representing features of speech. The frame is a segment of an input signal for calculating one feature vector. The frame is set so that a center time shifts at every predetermined interval. In addition, a plurality of frames have time lengths identical to one another, for example. The segment of each frame may partially overlap that of another frame.

The pattern recognition model storage 24 stores a pattern recognition model. The pattern recognition model is data used by the score calculator 26 for performing pattern recognition of an input signal. The pattern recognition model is appropriately trained by a learning device in advance of the recognition of the input signal that is performed by the recognition apparatus 10. For example, the pattern recognition model storage 24 may be realized by a server on a network. In addition, when the recognition apparatus 10 performs speech recognition, the pattern recognition model storage 24 stores an acoustic model.

Based on the feature vector calculated by the feature extractor 22 for each frame, the score calculator 26 calculates a score vector sequence in which a plurality of score vectors are arranged, using the pattern recognition model stored in the pattern recognition model storage 24. The score vectors include the respective scores of symbols each being an element of a predefined symbol set. For example, when the recognition apparatus 10 performs speech recognition, the score vectors include respective acoustic scores of the symbols.

The respective scores included in the score vectors correspond to any of symbols. Each score represents likelihood of information represented by a corresponding symbol being included in an input signal. For example, an acoustic score represents likelihood of acoustic information represented by a corresponding symbol being included in a speech signal. In addition, frame synchronization (temporal synchronization) needs not be performed between information included in an input signal, and information represented by a symbol. In other words, the information represented by the symbol may be later than the information included in the input signal. For example, when the input signal is a speech signal, among acoustic scores included in score vectors calculated by the score calculator 26 based on an input of a feature vector of the 15th frame, acoustic information represented by an input symbol corresponding to the best acoustic score may be included in any of the first to tenth frames.

The score vectors are normalized so that the combination of all scores included therein equals a specific value (e.g., 1). For example, when the scores represent probability or likelihood, the score vectors are normalized so that the addition of all scores included therein equals a specific value. In addition, when the scores represent logarithmic probability or logarithmic likelihood, the score vectors are normalized so that exponential calculation of each of the scores included therein, and subsequent addition of all the resultant scores produce a specific value.

For example, a score may represent probability, likelihood, logarithmic likelihood, or logarithmic probability of information represented by a corresponding symbol being included in an input signal. A larger value of the score may indicate a better score (i.e., more likely), or a smaller value may indicate a better score. For example, when the score represents probability, likelihood, logarithmic probability, or logarithmic likelihood, a larger value of the score indicates a better score. In addition, for example, when the score represents logarithmic probability with a reversed sign or logarithmic likelihood with a reversed sign, a smaller value of the score indicates a better score. In addition, when the score represents some sort of distance between an input signal (feature vector) and a pattern recognition model, a smaller value of the score indicates a better score.

In addition, a symbol corresponding to the best score among a plurality of scores included in the score vectors will be hereinafter referred to as a representative symbol. For example, when a larger score is better, a symbol corresponding to the largest score included in the score vectors will be referred to as a representative symbol. In addition, when a smaller score is better, a symbol corresponding to the smallest score included in the score vectors will be referred to as a representative symbol.

The score vector sequence is information in which a plurality of score vectors are arranged. The score calculator 26 gives the calculated score vector sequence to the filtering unit 28. In addition, the feature extractor 22 and the score calculator 26 correspond to a calculator that calculates a score vector sequence based on an input signal.

The filtering unit 28 receives the score vector sequence from the score calculator 26. The filtering unit 28 causes partial score vectors of the score vector sequence calculated by the score calculator 26, to pass through. In other words, the filtering unit 28 deletes partial score vectors from the score vector sequence output from the score calculator 26, and sequentially outputs the remaining score vectors.

More specifically, among the score vector sequence, the filtering unit 28 causes a first score vector in which a representative symbol is a recognition-target symbol, and a second score vector in which a representative symbol is a non-target symbol and a score of the representative symbol is worse than a first threshold, to pass through.

Furthermore, among third score vectors in which representative symbols are non-target symbols and scores of the representative symbols are equal to the first threshold or better than the first threshold that are included in the score vector sequence, the filtering unit 28 causes a third score vector satisfying the predefined first condition, to pass through. In other words, the filtering unit 28 deletes third score vectors not satisfying the first condition, from the third score vectors included in the score vector sequence, and causes the other score vectors to pass through.

For example, the filtering unit 28 determines any one or more and K−1 or less third score vectors of consecutive K (K is an integer of two or more) third score vectors as the third score vector satisfying the first condition. In addition, for example, the filtering unit 28 may determine any one third score vector of the consecutive K third score vectors as the third score vector satisfying the first condition.

In addition, alternatively, when a representative symbol included in an immediately preceding score vector of a partial vector sequence constituted by the consecutive K third score vectors, and a representative symbol included in an immediately following score vector of the partial vector sequence are identical, the filtering unit 28 may determine one or more and K−1 or less third score vectors of the partial vector sequence as the third score vector satisfying the first condition.

The filtering unit 28 gives, to the searching unit 32, a score vector sequence including passed score vectors. In addition, processing performed by the filtering unit 28 will be further described with reference to a flow illustrated in FIG. 7.

The search model storage 30 stores a search model. The search model is data used by the searching unit 32 for generating a symbol sequence and an output symbol sequence from the score vector sequence. The search model is appropriately trained by a learning device in advance of the recognition of an input signal that is performed by the recognition apparatus 10. For example, the search model storage 30 may be realized by a server on a network.

The searching unit 32 receives the score vector sequence output from the filtering unit 28. The searching unit 32 generates a symbol sequence by searching for a symbol path that follows likely scores in the received score vector sequence. The searching unit 32 may generate a symbol sequence using the search model stored in the search model storage 30. The symbol path is a series of symbols selected for each score vector. In addition, when the number of elements in the symbol set is denoted by x, and the length of the score vector sequence is denoted by y, the number of combinations possible as a symbol path is represented as $x^y$. The searching unit 32 may directly store the symbol path as a symbol sequence, or may indirectly store the symbol path by referring to the search model.

Furthermore, based on recognition-target symbols included in the symbol sequence, the searching unit 32 generates an output symbol representing a pattern recognition result of an input signal. The searching unit 32 generates the pattern recognition result of the input signal by combining consecutive identical recognition-target symbols on the path into one. In addition, for example, the searching unit 32 may generate the pattern recognition result of the input signal by combining consecutive identical recognition-target symbols on the path into one, and then, excluding non-target symbols on the path. The searching unit 32 may generate an output symbol using the search model stored in the search model storage 30.

The above-described searching unit 32 may generate, after generating a symbol sequence, an output symbol based on the symbol sequence. In addition, the searching unit 32 may collectively generate a symbol sequence and an output symbol. In addition, the searching unit 32 may generate one symbol sequence, or may generate M symbol sequences. In addition, from each symbol sequence, the searching unit 32 may generate one output symbol, or may generate a plurality of output symbols arranged in chronological order.

For example, the search model used by the searching unit 32 is a weighted finite-state transducer (WFST). In this case, based on a Viterbi algorithm, the searching unit 32 searches for a symbol path on which an accumulated value of scores becomes the best. In addition, the search model used by the searching unit 32 may be a recurrent neural network (RNN) or a network deriving from an RNN. By using such a search model, the searching unit 32 can place restrictions on a path that can be retrieved as a symbol path, specify a path to be preferentially retrieved in the searching, and specify a symbol sequence to be preferentially generated even if the score is bad. Furthermore, the search model includes information representing correspondence relationship between a symbol sequence and an output symbol. When the search model is a WFST, the searching unit 32 may store a symbol path according to a path on the WFST, that is, a combination of a state and transition of the WFST.

Then, the searching unit 32 outputs the generated output symbol as a recognition result of an input signal.

Figure 2:
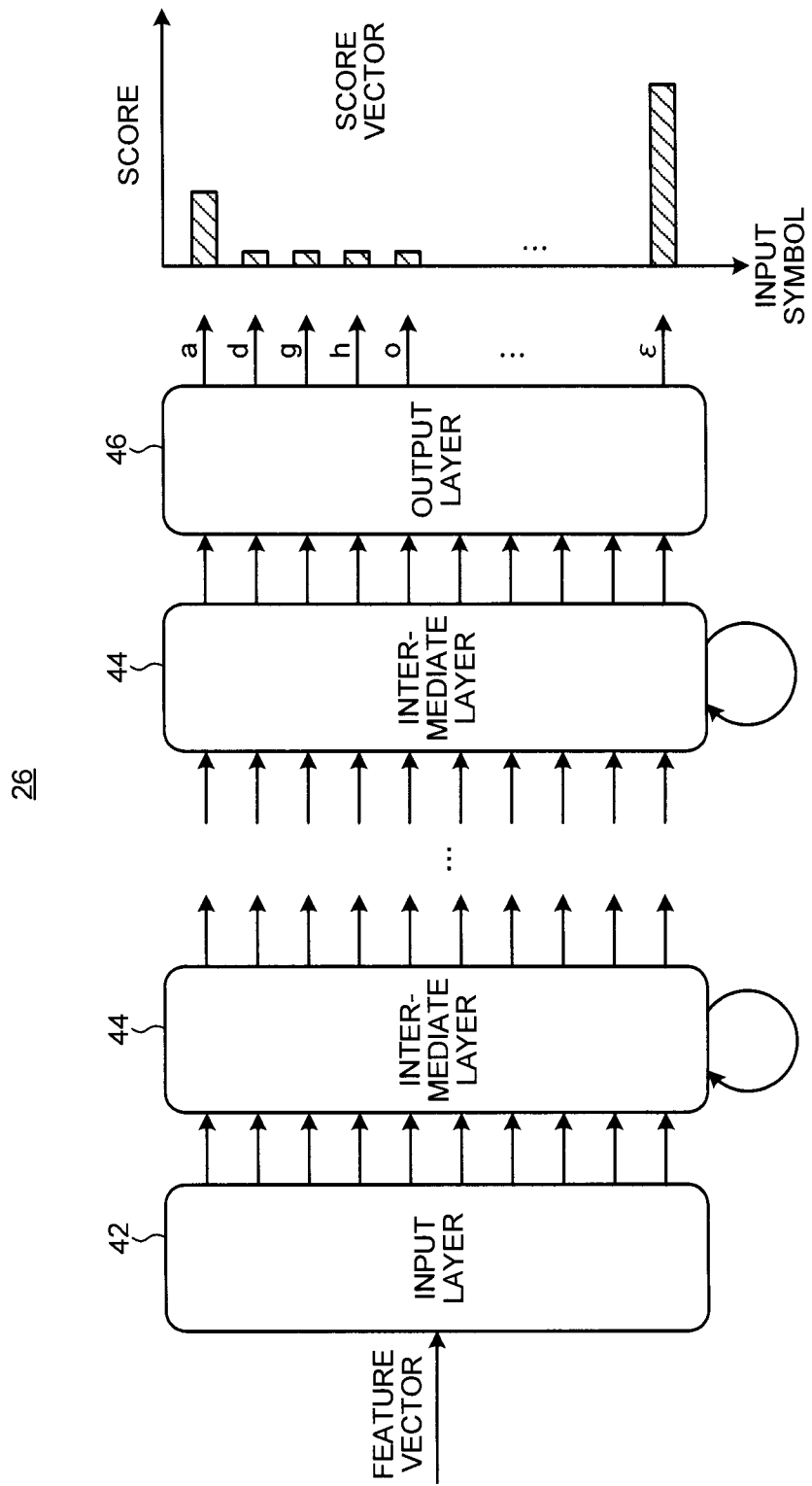
FIG. 2 is a diagram illustrating an example of a configuration of a score calculator.

FIG. 2 is a diagram illustrating an example of a configuration of the score calculator 26. As illustrated in FIG. 2, for example, the score calculator 26 may be a recurrent neural network (RNN) to which Connectionist Temporal Classification (CTC) is applied.

For example, the score calculator 26 includes an input layer 42, at least one intermediate layer 44, and an output layer 46. The input layer 42, the intermediate layer 44, and the output layer 46 each execute acquisition processing of at least one signal, calculation processing of the acquired signal, and output processing of the at least one signal.

The input layer 42, the at least one intermediate layer 44, and the output layer 46 are connected in series. The input layer 42 receives a feature vector, and executes calculation processing. Then, the input layer 42 outputs at least one signal obtained as a calculation result, to the intermediate layer 44 on a subsequent stage. In addition, each of the intermediate layers 44 executes calculation processing on at least one signal received from the preceding stage. Then, each of the intermediate layers 44 outputs at least one signal obtained as a calculation result, to the intermediate layer 44 on a subsequent stage or the output layer 46. Furthermore, each of the intermediate layers 44 may have a returning path for returning a signal to itself.

The output layer 46 executes calculation processing on the signal received from the intermediate layer 44 on the preceding stage. Then, the output layer 46 outputs a score vector as a calculation result. The output layer 46 outputs signals in the number corresponding to the number of symbols. Each signal output from the output layer 46 is associated with a corresponding one of symbols. For example, the output layer 46 executes calculation using a softmax function.

In addition, parameters used by each layer for calculation processing are given from the pattern recognition model stored in the pattern recognition model storage 24. Based on the feature vector, the pattern recognition model is pre-trained by a learning device so as to output the respective scores of symbols included in a predefined symbol set. In other words, the pattern recognition model is trained by the learning device so as to output the score of each of at least one recognition-target symbol, and the score of a non-target symbol.

The score calculator 26 can thereby simultaneously output the respective scores of the symbols included in a symbol set. In other words, the score calculator 26 can simultaneously output the respective scores of at least one recognition-target symbol and a non-target symbol.

In addition, in place of the RNN, the score calculator 26 may be a network called long short-term memory obtained by extending the RNN. In addition, in place of the softmax function, the output layer 46 may use a support vector machine (e.g., Yichuan Tang, "Deep Learning using Linear Support Vector Machines", arXiv: 1306.0239v4 [cs.LG], Feb. 21, 2015).

Figures 3, 4:
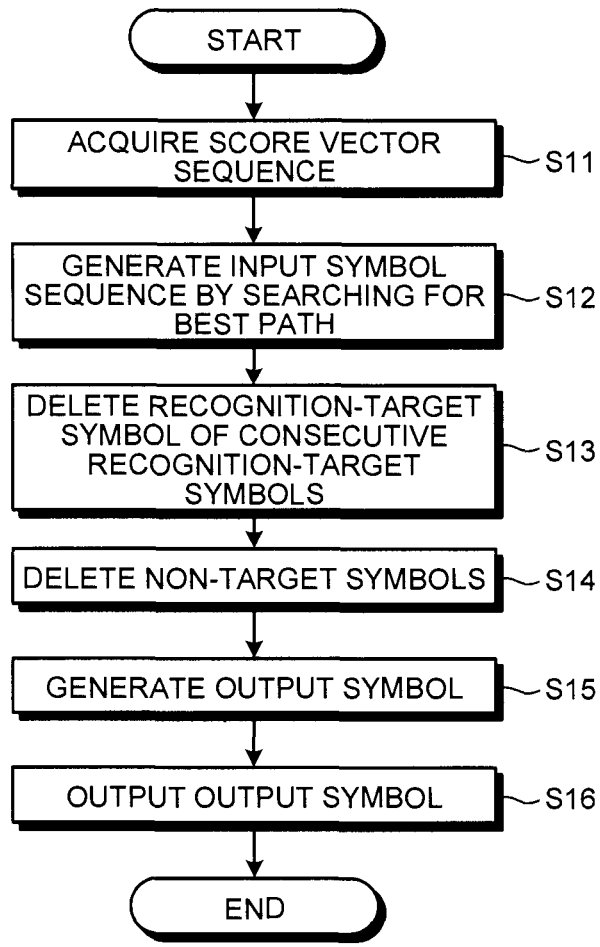
FIG. 3 is a diagram illustrating a processing flow of a searching unit.
FIG. 4 is a diagram illustrating an example of a symbol sequence retrieved by the searching unit.

FIG. 3 is a diagram illustrating a processing flow of the searching unit 32. When generating the best one symbol sequence, the searching unit 32 executes processing using a procedure as illustrated in FIG. 3.

First, in S11, the searching unit 32 acquires a score vector sequence from the filtering unit 28. Subsequently, in S12, based on the score vector sequence, the searching unit 32 searches for a likely symbol path, and generates one symbol sequence. For example, the searching unit 32 may generate a symbol sequence by selecting, for each frame, a symbol having the best score, and connecting the selected symbols. In addition, for example, the searching unit 32 may generate a symbol sequence by searching for the best path based on the Viterbi algorithm or the like using a search model such as a WFST.

Subsequently, in S13, among the symbol sequence, the searching unit 32 detects a section in which a plurality of recognition-target symbol are consecutively arranged, leaves any one of the plurality of consecutive recognition-target symbols, and deletes the others. The searching unit 32 can thereby prevent identical information (e.g., identical linguistic information) from being redundantly recognized.

For example, among the symbol sequence, the searching unit 32 leaves a leading one of the plurality of consecutive recognition-target symbols, and deletes the second and subsequent recognition-target symbols. Alternatively, among the symbol sequence, the searching unit 32 may leave the last one of the plurality of consecutive recognition-target symbols, and delete the others.

Subsequently, in S14, among the symbol sequence processed in S13, the searching unit 32 leaves recognition-target symbols, and deletes non-target symbols. In other words, among the symbol sequence, the searching unit 32 leaves only recognition-target symbols. The searching unit 32 can thereby generate an output symbol based on the recognition-target symbols.

Subsequently, in S15, the searching unit 32 generates an output symbol from the symbol sequence processed in S13 and S14. In other words, the searching unit 32 generates an output symbol from the symbol sequence only including recognition-target symbols.

For example, referring to a search model being a correspondence table of a symbol sequence and an output symbol, the searching unit 32 sequentially extracts, in order from a leading symbol of the symbol sequence, an output symbol matching a part of the symbol sequence. For example, the search model being a correspondence table of a symbol sequence and an output symbol may be a pronunciation dictionary in which a phonetic symbol sequence and a word are associated. In addition, the searching unit 32 may chronologically generate a plurality of output symbols from one symbol sequence.

In addition, the searching unit 32 may independently execute the processes in S12, S13, S14, and S15. In addition, when the search model is a WFST, the searching unit 32 may collectively execute the processes in S12, S13, S14, and S15.

Subsequently, in S16, the searching unit 32 outputs each output symbol as a recognition result of an input signal.

In addition, the searching unit 32 may generate M symbol sequences. In this case, the searching unit 32 executes the processes in S12 to S15 for each of the symbol sequences. In addition, when the search model is a WFST, by collectively executing the processes in S12 to S15, the searching unit 32 can generate M symbol sequences.

FIGS. 4, 5, and 6 are diagrams for describing details of processing performed by the searching unit 32 when alphabets are recognized. When alphabets are recognized from a speech signal according to the processing flow illustrated in FIG. 3, the searching unit 32 executes the following processing.

In addition, a pattern recognition model (acoustic model) is pre-trained by a learning device so as to recognize alphabets included in a symbol set. In addition, in many cases, recognition-target symbols are phoneme symbols. Nevertheless, in this example, the acoustic model is learned so as to recognize alphabets. Such a learning method is described in Alex Graves and Navdeep Jaitly, "Towards end-to-end speech recognition with recurrent neural networks", in Proceedings of the 31st International Conference on Machine Learning (ICML-14), pp. 1764-1772, 2014, for example.

For example, in S12, the searching unit 32 generates a symbol sequence as illustrated in FIG. 4. Here, for example, a predefined symbol set is assumed to be as follows.

symbol set={ε, d, g, o}

In addition, recognition-target symbols are assumed to be as follows.

set of recognition-target symbols={d, g, o}

In addition, a non-target symbol is assumed to be as follows. In addition, ε is a symbol representing that it is undetermined which piece of acoustic information among acoustic information pieces represented by recognition-target symbols is included in a speech signal.

non-target symbol=ε

In S13, among the symbol sequence, the searching unit 32 leaves a leading one of the plurality of consecutive recognition-target symbols, and deletes the second and subsequent recognition-target symbols. For example, in the example illustrated in FIG. 5, the third symbol and the fourth symbol are both "g". In addition, the 13th symbol and the 14th symbol are both "d". Thus, in S13, the searching unit 32 leaves the third symbol, and deletes the fourth symbol. In addition, the searching unit 32 leaves the 13th symbol, and deletes the 14th symbol.

Subsequently, in S14, among the symbol sequence processed in S13, the searching unit 32 leaves recognition-target symbols, and deletes non-target symbols. For example, as illustrated in the example in FIG. 6, the searching unit 32 deletes "ε" from the symbol sequence, and leaves "d", "g", and "o".

Then, in S15, referring to a search model being a correspondence table of a symbol sequence and an output symbol, from the symbol sequence processed in S13 and S14, the searching unit 32 sequentially extracts, in order from a leading symbol of the symbol sequence, an output symbol matching a part of the symbol sequence. For example, as illustrated in FIG. 6, the searching unit 32 generates "good" as an output symbol.

Figure 7:
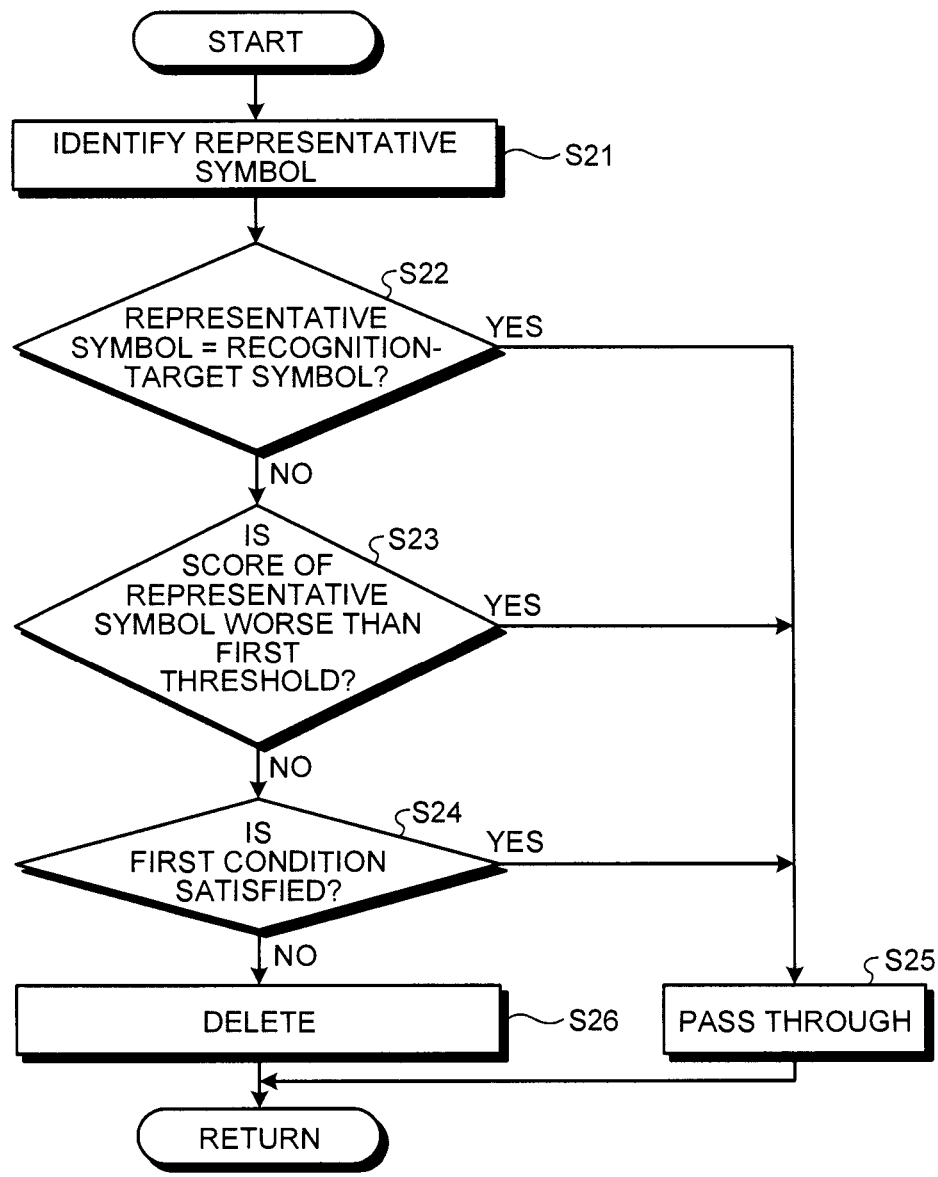
FIG. 7 is a diagram illustrating a processing flow of a filtering unit.

FIG. 7 is a diagram illustrating a processing flow of the filtering unit 28. When the filtering unit 28 receives a score vector from the score calculator 26, the filtering unit 28 executes processing on the received score vector using a procedure as illustrated in FIG. 7.

First, in S21, the filtering unit 28 identifies a representative symbol in the score vector. In other words, the filtering unit 28 identifies the best score among a plurality of scores included in the score vector. Then, the filtering unit 28 identifies, as a representative symbol, a symbol corresponding to the identified best score.

Subsequently, in S22, the filtering unit 28 determines whether the identified representative symbol is a recognition-target symbol. In other words, the filtering unit 28 determines whether the acquired score vector is the first score vector in which a representative symbol is a recognition-target symbol.

When the representative symbol is a recognition-target symbol, that is, when the acquired score vector is the first score vector (Yes in S22), the filtering unit 28 advances the processing to S25. Then, in S25, the filtering unit 28 causes the acquired first score vector to pass through to give the acquired first score vector to the searching unit 32 on a subsequent stage. The filtering unit 28 can thereby add a score vector (the first score vector) in which possibility that a recognition-target symbol is selected as a path is high, to a search target. As a result, the filtering unit 28 can maintain recognition accuracy in the searching unit 32 on the subsequent stage.

In addition, when the representative symbol is not a recognition-target symbol, that is, when the representative symbol is a non-target symbol (No in S22), the filtering unit 28 advances the processing to S23.

In S23, the filtering unit 28 determines whether the score of the representative symbol is worse than the predefined first threshold. In other words, in S23, the filtering unit 28 determines whether the acquired score vector is the second score vector in which the representative symbol is a non-target symbol, and the score of the representative symbol is worse than the first threshold.

When the score of the representative symbol is worse than the first threshold, that is, when the acquired score vector is the second score vector (Yes in S23), the filtering unit 28 advances the processing to S25. Then, in S25, the filtering unit 28 causes the acquired second score vector to pass through to give the acquired second score vector to the searching unit 32 on the subsequent stage. The filtering unit 28 can thereby add a score vector (the second score vector) in which possibility that a non-target symbol is selected as a path is lower than a predefined value, to a search target. As a result, the filtering unit 28 can maintain recognition accuracy in the searching unit 32 on the subsequent stage.

In addition, when the score of the representative symbol is equal to the first threshold or better than the first threshold (No in S23), the filtering unit 28 advances the processing to S24. In other words, when the acquired score vector is the third score vector in which the representative symbol is a non-target symbol, and the score of the representative symbol is equal to the first threshold or better than the first threshold, the filtering unit 28 advances the processing to S24.

In S24, the filtering unit 28 determines whether the acquired score vector (i.e., the third score vector) satisfies the predefined first condition. For example, the first condition is a condition for determining whether an input signal can be recognized more accurately in a case in which the acquired score vector is included in the score vector sequence, than a case in which the acquired score vector is not included in the score vector sequence.

When the acquired third score vector satisfies the first condition (Yes in S24), the filtering unit 28 advances the processing to S25. Then, in S25, the filtering unit 28 causes the acquired third score vector satisfying the first condition, to pass through to give the acquired third score vector to the searching unit 32 on the subsequent stage. The filtering unit 28 can thereby add a score vector (the third score vector satisfying the first condition) in which possibility that a recognition-target symbol is selected as a path is low, but possibility of contributing to the maintenance of recognition accuracy is high, to a search target. As a result, the filtering unit 28 can maintain recognition accuracy in the searching unit 32 on the subsequent stage.

In addition, when the acquired third score vector does not satisfy the first condition (No in S24), the filtering unit 28 advances the processing to S26. Then, in S26, the filtering unit 28 deletes the acquired third score vector not satisfying the first condition, from the score vector sequence. The filtering unit 28 can thereby exclude a score vector (the third score vector not satisfying the first condition) in which possibility that a recognition-target symbol is selected as a path is low, and furthermore, possibility of contributing to the maintenance of recognition accuracy is also low, from a search target. As a result, the filtering unit 28 can reduce calculation costs in the searching unit 32 on the subsequent stage.

Then, when the filtering unit 28 finishes the processing in S25 or S26, the filtering unit 28 repeats the processing from S21 for the next score vector. In addition, the filtering unit 28 may execute the processes in S22, S23, and S24 in any order, and may collectively execute the processes.

Figure 8:
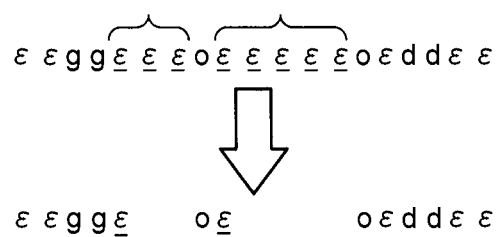
FIG. 8 is a diagram illustrating a first example of a score vector sequence obtainable before processing is performed by the filtering unit, and a score vector sequence obtainable after the processing is performed by the filtering unit.

FIG. 8 is a diagram illustrating a first example of a score vector sequence obtainable before processing is performed by the filtering unit 28, and a score vector sequence obtainable after the processing is performed by the filtering unit 28. FIG. 8 illustrates a representative symbol (symbol having the best score) included in each score vector. In addition, in FIG. 8, ε with an underscore represents a score vector in which a representative symbol is a non-target symbol, and the score of the representative symbol is equal to the first threshold or better than the first threshold. In other words, ε with an underscore represents the third score vector. In addition, the same applies to FIG. 9.

The filtering unit 28 determines one or more and K−1 or less third score vectors of consecutive K (K is an integer of two or more) third score vectors as the third score vector satisfying the first condition. Then, among the consecutive K third score vectors, the filtering unit 28 causes the third score vector satisfying the first condition, to pass through, and deletes the third score vector not satisfying the first condition.

For example, the filtering unit 28 determines one third score vector of the consecutive K third score vectors as the third score vector satisfying the first condition. Then, among the consecutive K third score vectors, the filtering unit 28 causes the one third score vector satisfying the first condition, to pass through, and deletes the third score vector not satisfying the first condition.

For example, in the example illustrated in FIG. 8, the fifth to seventh score vectors constitute consecutive three third score vectors. In the example illustrated in FIG. 8, among the fifth to seventh consecutive three score vectors, the filtering unit 28 causes a leading one score vector (the fifth score vector) to pass through to a subsequent stage, as the third score vector satisfying the first condition. Then, the filtering unit 28 deletes the score vectors other than the leading one score vector (the sixth and seventh score vectors) as the third score vectors not satisfying the first condition.

In addition, for example, in the example illustrated in FIG. 8, the ninth to 13th score vectors constitute consecutive five third score vectors. In the example illustrated in FIG. 8, among the ninth to 13th consecutive five score vectors, the filtering unit 28 causes a leading one score vector (the ninth score vector) to pass through to a subsequent stage, as the third score vector satisfying the first condition. Then, the filtering unit 28 deletes the score vectors other than the leading one score vector (the tenth to 13th score vectors) as the third score vectors not satisfying the first condition.

In this manner, when consecutive K third score vectors are included, the filtering unit 28 can certainly give one third score vector to the searching unit 32.

When two identical recognition-target symbols are consecutively arranged, the searching unit 32 executes recognition processing by combining these two recognition-target symbols into one (e.g., the processing illustrated in FIG. 5). Thus, if all non-target symbols existing between the two identical recognition-target symbols are deleted, the searching unit 32 misrecognizes, as one recognition-target symbol, the two recognition-target symbols to be originally recognized as separate symbols.

For avoiding such misrecognition, the filtering unit 28 gives at least one non-target symbol of the consecutive K third score vectors to the searching unit 32. The searching unit 32 can thereby separately recognize each of the two recognition-target symbols without executing the processing of combing two recognition-target symbols into one.

In this manner, because the filtering unit 28 leaves at least one non-target symbol of non-target symbols existing between two recognition-target symbols, the filtering unit 28 can avoid misrecognition. Meanwhile, when K (K is an integer of two or more) recognition-target symbols are consecutively arranged, the filtering unit 28 deletes at least one or more recognition-target symbols. This can also reduce costs of calculation performed by the searching unit 32.

In addition, the filtering unit 28 may cause a score vector other than a leading score vector among consecutive two or more third score vectors, to pass through. In addition, the filtering unit 28 may cause any number of third score vectors to pass through as long as the number is one or more and K−1 or less.

Figure 9:
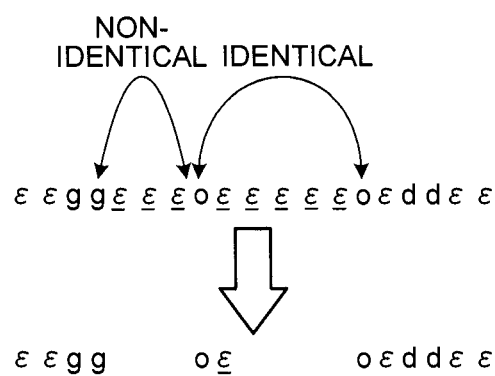
FIG. 9 is a diagram illustrating a second example of a score vector sequence obtainable before processing is performed by the filtering unit, and a score vector sequence obtainable after the processing is performed by the filtering unit.

FIG. 9 is a diagram illustrating a second example of a score vector sequence obtainable before processing is performed by the filtering unit 28, and a score vector sequence obtainable after the processing is performed by the filtering unit 28. A sequence constituted by consecutive K (K is an integer of two or more) third score vectors is assumed to be a partial vector sequence.

When a representative symbol included in an immediately preceding score vector of a partial vector sequence, and a representative symbol included in an immediately following score vector of the partial vector sequence are identical, the filtering unit 28 determines one or more and K−1 or less third score vectors of the partial vector sequence as the third score vector satisfying the first condition. Then, among the partial vector sequence, the filtering unit 28 causes the third score vector satisfying the first condition, to pass through, and deletes the third score vector not satisfying the first condition.

For example, in the example illustrated in FIG. 9, the fifth to seventh score vectors constitute a partial vector sequence. A representative symbol included in an immediately preceding score vector (the fourth score vector) of the partial vector sequence including the fifth to seventh score vectors is "g". In addition, a representative symbol included in an immediately following score vector (the eighth score vector) of the partial vector sequence including the fifth to seventh score vectors is "o". In other words, the representative symbol included in the immediately preceding score vector of the partial vector sequence including the fifth to seventh score vectors, and the representative symbol included in the immediately following score vector of the partial vector sequence are not identical. Thus, in the example illustrated in FIG. 9, the filtering unit 28 deletes all the three score vectors constituting the partial vector sequence including the fifth to seventh score vectors, as the third score vectors not satisfying the first condition.

In addition, for example, in the example illustrated in FIG. 9, the ninth to 13th score vectors constitute a partial vector sequence. A representative symbol included in an immediately preceding score vector (the eighth score vector) of the partial vector sequence including the ninth to 13th score vectors is "o". In addition, a representative symbol included in an immediately following score vector (the 14th score vector) of the partial vector sequence including the ninth to 13th score vectors is "σ". In other words, the representative symbol included in the immediately preceding score vector of the partial vector sequence including the ninth to 13th score vectors, and the representative symbol included in the immediately following score vector of the partial vector sequence are identical. Thus, in the example illustrated in FIG. 9, among the partial vector sequence including the ninth to 13th score vectors, the filtering unit 28 causes a leading one score vector to pass through to a subsequent stage, as the third score vector satisfying the first condition. Then, among the partial vector sequence including the ninth to 13th score vectors, the filtering unit 28 deletes the score vectors other than the leading one score vector as the third score vectors not satisfying the first condition.

Even if the filtering unit 28 executes the processing in this manner, the filtering unit 28 can give, to the searching unit 32, at least one non-target symbol of non-target symbols existing between two identical recognition-target symbols. The searching unit 32 can thereby separately recognize each of the two recognition-target symbols without executing the processing of combing two recognition-target symbols into one. Thus, the filtering unit 28 can avoid misrecognition.

In addition, the filtering unit 28 does not give, to the searching unit 32, non-target symbols existing between two nonidentical recognition-target symbols. Accordingly, the searching unit 32 needs not execute search processing of non-target symbols existing between two nonidentical recognition-target symbols. Thus, the filtering unit 28 can further reduce calculation costs of search processing.

In addition, among a partial vector sequence, the filtering unit 28 may cause a score vector other than a leading score vector to pass through. In addition, among the partial vector sequence, the filtering unit 28 may cause any number of score vectors to pass through as long as the number is one or more and K−1 or less.

Figures 10, 11:
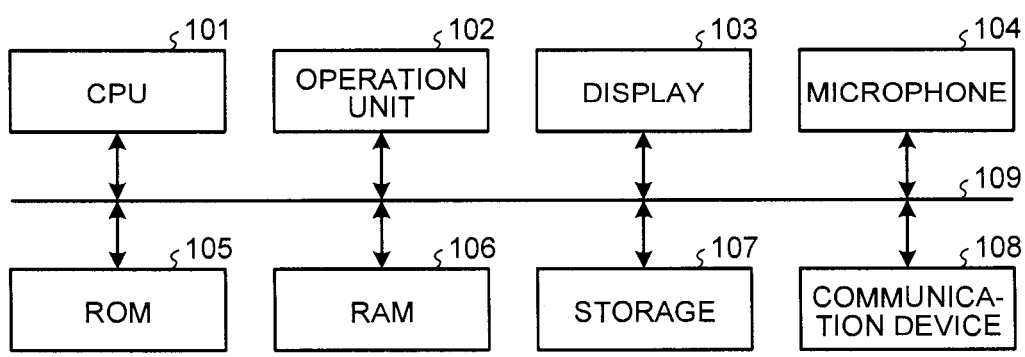
FIG. 10 is a diagram illustrating an example of a pseudo-code representing processing performed by the recognition apparatus.
FIG. 11 is a hardware block diagram of the recognition apparatus.

FIG. 10 is a diagram illustrating an example of a pseudo-code representing recognition processing performed by the recognition apparatus 10. As an example, the recognition apparatus 10 executes the pseudo-code illustrated in FIG. 10, sequentially from the first line.

On the first line, the recognition apparatus 10 substitutes $\xi_{initial}$ into $\xi$, 0 into $\eta$, and $\epsilon$ into $\sigma$.

In $\xi$, a plurality of symbol sequences being searched for, and corresponding output symbols are stored. For example, in $\xi$, a path of a WFST retrieved based on the Viterbi algorithm may be stored. $\xi_{initial}$ represents an initial state of $\xi$. By executing the first line, the recognition apparatus 10 can initialize $\xi$.

$\eta$ is a variable into which any of 0, 1, and 2 is to be substituted. More specifically, when 0 is substituted thereinto, $\eta$ indicates that a representative symbol of the ith frame is a non-target symbol, and search processing has been executed for the ith frame. When 1 is substituted thereinto, $\eta$ indicates that a representative symbol of the ith frame is a recognition-target symbol, and search processing has been executed. In addition, when the representative symbol is a recognition-target symbol, the recognition apparatus 10 always executes the search processing for the frame. In addition, when 2 is substituted thereinto, $\eta$ indicates that a representative symbol of the ith frame is a non-target symbol, representative symbols in frames from the next frame of the last frame in which a representative symbol is a recognition-target symbol, to the ith frame are all non-target symbols, and search processing has not been executed.

$\sigma$ is a variable in which a representative symbol of the current frame is stored. $\epsilon$ represents a non-target symbol. By executing the first line, the recognition apparatus 10 can substitute initial values into $\eta$ and $\sigma$.

The second line indicates that integers from 1 to N are sequentially substituted into i, and processing on the third to 20th lines is repeated each time an integer is substituted into i. i is a variable. N represents a total number of frames of an input signal. The recognition apparatus 10 executes the processing on the third to 20th lines for each of the first frame to the Nth frame of the input signal.

On the third line, the recognition apparatus 10 substitutes a processing result of extract_features($f_i$) into v. v is a variable in which a feature vector is stored. $f_i$ represents an input signal of the ith frame.

extract_features($f_i$) represents a function for calculating a feature vector from the input signal of the ith frame. By executing the third line, the recognition apparatus 10 can calculate the feature vector of the ith frame.

On the fourth line, the recognition apparatus 10 substitutes calc_scores(v) into s. s is a variable in which a score vector is stored. calc_scores(v) is a function for calculating a score vector from a feature vector. By executing the fourth line, the recognition apparatus 10 can calculate the score vector of the ith frame.

On the fifth line, the recognition apparatus 10 substitutes $\sigma$ into $\sigma_{prev}$. $\sigma_{prev}$ is a variable in which a representative symbol of an immediately preceding frame (the (i−1)th frame) is stored. In addition, when the current frame is the first frame, $\epsilon$ being an initial value is substituted into a $\sigma_{prev}$.

On the sixth line, the recognition apparatus 10 substitutes a representative symbol of the ith frame into $\sigma$. In addition, a function in which "a∈Σ" is added below "argmax s[a]" indicated on the sixth line is a function for acquiring a representative symbol. The function in which "a∈Σ" is added below "argmax s[a]" is a function for acquiring a symbol having the largest s[a] among symbols included in Σ. Σ represents a symbol set. s[a] represents a score corresponding to "a" among the score vectors of the ith frame. By executing the function, the recognition apparatus 10 can acquire a symbol corresponding to the largest score, from the score vectors of the ith frame.

In addition, in the pseudo-code illustrated in FIG. 10, a larger value of a score included in a score vector indicates a better score. If a smaller value of the score indicates a better score, on the sixth line, the recognition apparatus 10 may execute a function in which "a∈Σ" is added below "argmin s[a]". By executing the function, the recognition apparatus 10 can acquire a symbol corresponding to the smallest score, from the score vectors of the ith frame.

On the seventh line, the recognition apparatus 10 determines whether $\sigma=\epsilon 0$ is satisfied. In other words, the recognition apparatus 10 determines whether the representative symbol of the ith frame is a non-target symbol. When the representative symbol of the ith frame is a non-target symbol, the recognition apparatus 10 executes the eighth to 15th lines. In addition, when the representative symbol of the ith frame is not a non-target symbol, that is, when the representative symbol of the ith frame is a recognition-target symbol, the recognition apparatus 10 executes the 17th to 20th lines.

On the eighth line, the recognition apparatus 10 determines whether s[$\epsilon$]<θ is satisfied. s[$\epsilon$] represents the score of the non-target symbol of the ith frame, that is, the score of the representative symbol of the ith frame. θ represents a predefined first threshold. In other words, the recognition apparatus 10 determines whether the score of the representative symbol is smaller than the predefined first threshold. The recognition apparatus 10 can thereby determine whether the score of the representative symbol is worse than the first threshold. In addition, when a smaller value of the score indicates a better score, on the eighth line, the recognition apparatus 10 can determine the score by determining whether $s[\varepsilon]>\theta$ is satisfied.

When the score of the representative symbol of the ith frame is smaller than the first threshold, that is, the score of the representative symbol of the ith frame is worse than the first threshold, the recognition apparatus 10 executes the ninth to tenth lines. When the score of the representative symbol of the ith frame is not smaller than the first threshold, that is, the score of the representative symbol of the ith frame is equal to the first threshold or better than the first threshold, the recognition apparatus 10 executes the 12th to 15th lines.

On the ninth line, the recognition apparatus 10 substitutes a processing result of search($\xi$,s) into $\xi$. search($\xi$,s) is a function for acquiring a search result of a symbol sequence and an output symbol from a score vector sequence to which the score vectors of the ith frame are added. By executing the ninth line, the recognition apparatus 10 can generate a symbol sequence and an output symbol at a stage where searching of frames up to the ith frame has been finished. When the path of a WFST is searched for based on the Viterbi algorithm, the recognition apparatus 10 may extend the path of the WFST by new one score vector, and store the resultant path into $\xi$ as a processing result.

On the tenth line, the recognition apparatus 10 substitutes 0 into $\eta$. $\eta$ can thereby indicate that the representative symbol of the ith frame is a non-target symbol, and search processing has been executed for the ith frame.

When the recognition apparatus 10 finishes the tenth line, the recognition apparatus 10 finishes the processing for the ith frame, and executes the processing from the third line for the next frame.

On the 12th line, the recognition apparatus 10 determines whether $\eta=1$ is satisfied. In other words, the recognition apparatus 10 determines whether a representative symbol of the immediately preceding frame (the (i−1)th frame) is a recognition-target symbol.

When the representative symbol of the immediately preceding frame is a recognition-target symbol, the recognition apparatus 10 executes the 13th to 15th lines.

On the 13th line, the recognition apparatus 10 substitutes s into $s_\varepsilon$. $s_\varepsilon$ is a variable in which a score vector is stored. By executing the 13th line, the recognition apparatus 10 stores the score vector of the ith frame into $s_\varepsilon$. The recognition apparatus 10 can thereby store a score vector of the next frame of the frame in which a representative symbol is a recognition-target symbol, into $s_\varepsilon$.

On the 14th line, the recognition apparatus 10 substitutes $\sigma_{prev}$ into r. r is a variable in which a symbol is stored. By executing the 14th line, the recognition apparatus 10 stores, into r, the representative symbol of the immediately preceding frame (the (i−1)th frame). The recognition apparatus 10 can thereby store, into r, the representative symbol in the last frame in which the representative symbol is a recognition-target symbol.

On the 15th line, the recognition apparatus 10 substitutes 2 into $\eta$. $\eta$ can thereby indicate that representative symbols in frames from the next frame of the last frame in which the representative symbol is a recognition-target symbol, to the ith frame are all non-target symbols, and search processing has not been executed.

When the recognition apparatus 10 finishes the 15th line, the recognition apparatus 10 finishes the processing for the ith frame, and executes the processing from the third line for the next frame.

In addition, on the 12th line, when the recognition apparatus 10 determines that the representative symbol of the immediately preceding frame is not a recognition-target symbol, that is, when the representative symbol of the ith frame is a non-target symbol and the representative symbol of the immediately preceding frame is a non-target symbol, the recognition apparatus 10 finishes the processing for the ith frame, and executes the processing from the third line for the next frame. The recognition apparatus 10 can thereby advance the processing to the next frame without executing search processing for the ith frame.

On the other hand, on the 17th line, the recognition apparatus 10 determines whether $\eta=2$ and $r=\sigma$ are satisfied. By determining whether $\eta=2$ is satisfied, the recognition apparatus 10 can determine whether representative symbols in all the frames from the next frame of the last frame in which the representative symbol is a recognition-target symbol, to the ith frame are non-target symbols, and search processing has not been executed. In addition, by determining whether $r=\sigma$ is satisfied, the recognition apparatus 10 can determine whether the representative symbol in the last frame in which the representative symbol is a recognition-target symbol, and the representative symbol in the ith frame are identical.

When $\eta=2$ and $r=\sigma$ are satisfied, the recognition apparatus 10 executes the 18th line.

On the 18th line, the recognition apparatus 10 substitutes a processing result of search($\xi$,$s_\varepsilon$) into $\xi$. By executing the 18th line, the recognition apparatus 10 can add a score vector of the next frame of the last frame in which the representative symbol is a recognition-target symbol, to the score vector sequence, and acquire a search result of a symbol sequence and an output symbol. In other words, by executing the 18th line, the recognition apparatus 10 can add a score vector of a frame in which a representative symbol is a non-target symbol, to the score vector sequence, and acquire a search result of a symbol sequence and an output symbol. The recognition apparatus 10 can thereby avoid processing of collectively recognizing identical recognition-target symbols as one, and maintain recognition accuracy.

On the 19th line, the recognition apparatus 10 substitutes a processing result of search($\xi$,s) into $\xi$. By executing the 19th line, the recognition apparatus 10 can add a score vector of the ith frame to the score vector sequence, and acquire a search result of a symbol sequence and an output symbol.

On the 20th line, the recognition apparatus 10 substitutes 1 into $\eta$. $\eta$ can thereby indicate that the representative symbol of the ith frame is a recognition-target symbol, and search processing has been executed. When the recognition apparatus 10 finishes the 20th line, the recognition apparatus 10 finishes the processing for the ith frame, and executes the processing from the third line for the next frame.

Then, on the 21st line, the recognition apparatus 10 returns a processing result of result($\xi$) for acquiring an output symbol by referring to $\xi$, to a program of an invoke of this pseudo-code. The recognition apparatus 10 can thereby output an output symbol.

As described above, by executing the processing according to the pseudo-code illustrated in FIG. 10, when a representative symbol included in an immediately preceding score vector of a partial vector sequence constituted by consecutive K third score vectors, and a representative symbol included in an immediately following score vector of the partial vector sequence are identical, the recognition apparatus 10 can determine a leading third score vector of the partial vector sequence as the third score vector satisfying the first condition.

In other words, the recognition apparatus 10 can search for the first score vector and the second score vector among the score vector sequence. Furthermore, among the score vector sequence, when a representative symbol included in an immediately preceding score vector of a partial vector sequence constituted by consecutive K or more third score vectors, and a representative symbol included in an immediately following score vector of the partial vector sequence are identical, the recognition apparatus 10 can search for a leading third score vector of the partial vector sequence, and skip the searching of third score vectors other than the leading third score vector of the partial vector sequence.

The recognition apparatus 10 can thereby perform pattern recognition of an input signal with small calculation costs while maintaining recognition accuracy.

In addition, the 17th line in the pseudo-code illustrated in FIG. 10 may be replaced by "if η=2". If a pseudo-code changed in this manner is executed, when a partial vector sequence constituted by consecutive K third score vectors is included, the recognition apparatus 10 can determine a leading third score vector of the partial vector sequence as the third score vector satisfying the first condition.

In other words, the recognition apparatus 10 can search for the first score vector and the second score vector among the score vector sequence. Furthermore, among the score vector sequence, the recognition apparatus 10 can search for a leading third score vector of a partial vector sequence constituted by consecutive two or more third score vectors, and skip the searching of third score vectors other than the leading third score vector of the partial vector sequence.

In addition, the pseudo-code illustrated in FIG. 10 indicates an example of searching for a leading one score vector of a partial vector sequence, and skipping the searching of remaining score vectors. Nevertheless, the recognition apparatus 10 may search for a score vector other than the leading score vector of the partial vector sequence, or may search for one or more score vectors of the partial vector sequence.

Modified Example

For example, when a search model is a WFST, the searching unit 32 can search for a plurality of symbol paths. In such a case, the filtering unit 28 may perform the following processing.

When a symbol having the $k_p$th ($k_p$ is an integer of one or more)—best score that is included in an immediately preceding score vector of a partial vector sequence constituted by consecutive K (K is an integer of two or more) third score vectors, and a symbol having the $k_n$th ($k_n$ is an integer of one or more)—best score that is included in an immediately following score vector of the partial vector sequence are identical, the filtering unit 28 may determine one or more and K−1 or less third score vectors of the partial vector sequence as the third score vector satisfying the first condition. The recognition apparatus 10 can thereby maintain recognition accuracy when the searching unit 32 does not select a representative symbol in the immediately preceding score vector of the partial vector sequence or the immediately following score vector of the partial vector sequence.

In addition, a set of symbols having top $k_p$ ($k_p$ is an integer of one or more) scores that is included in an immediately preceding score vector of a partial vector sequence constituted by consecutive K (K is an integer of two or more) third score vectors, and a set of symbols having top $k_p$ scores that is included in an immediately following score vector of the partial vector sequence are identical, the filtering unit 28 determines one or more and K−1 or less third score vectors of the partial vector sequence as the third score vector satisfying the first condition. Even in this case, the recognition apparatus 10 can maintain recognition accuracy when the searching unit 32 does not select a representative symbol in the immediately preceding score vector of the partial vector sequence or the immediately following score vector of the partial vector sequence.

In addition, when at least any one of symbols having top $k_p$ ($k_p$ is an integer of one or more) scores that is included in an immediately preceding score vector of a partial vector sequence constituted by consecutive K (K is an integer of two or more) third score vectors is identical to any one of symbols having top $k_n$ ($k_n$ is an integer of one or more) scores that are included in an immediately following score vector of the partial vector sequence, the filtering unit 28 determines one or more and K−1 or less third score vectors of the partial vector sequence as the third score vector satisfying the first condition. The recognition apparatus 10 can thereby maintain recognition accuracy when there is any possibility that the searching unit 32 selects identical symbols in the immediately preceding score vector of the partial vector sequence and the immediately following score vector of the partial vector sequence.

FIG. 11 is a hardware block diagram of the recognition apparatus 10. As an example, the recognition apparatus 10 is realized by a hardware configuration similar to that of a general computer (information processing apparatus). The recognition apparatus 10 includes a central processing unit (CPU) 101, an operation unit 102, a display 103, a microphone 104, a read only memory (ROM) 105, a random access memory (RAM) 106, a storage 107, a communication device 108, and a bus 109. The units are connected by the bus 109.

The CPU 101 uses a predetermined area of the RAM 106 as a work area, and executes various types of processing in cooperation with various programs prestored in the ROM 105 or the storage 107, to comprehensively control operations of the units (the feature extractor 22, the score calculator 26, the filtering unit 28, and the searching unit 32) constituting the recognition apparatus 10. In addition, the CPU 101 controls the operation unit 102, the display 103, the microphone 104, the communication device 108, and the like, in cooperation with programs prestored in the ROM 105 or the storage 107.

The operation unit 102 is an input device such as a mouse and a keyboard, and receives, as an instruction signal, information operated and input by a user, and outputs the instruction signal to the CPU 101.

The display 103 is a display device such as a liquid crystal display (LCD). The display 103 displays various types of information based on a display signal from the CPU 101. For example, the display 103 displays an output symbol or the like that is output by the searching unit 32. In addition, when an output symbol or the like is output to the communication device 108, the storage 107, or the like, the recognition apparatus 10 needs not include the display 103.

The microphone 104 is a device for inputting a speech signal. When pattern recognition of a prerecorded speech signal or a speech signal input from the communication device 108 is performed, or when pattern recognition of an input signal having a type other than speech is performed, the recognition apparatus 10 needs not include the microphone 104.

The ROM 105 stores programs and various types of setting information that are used for the control of the recognition apparatus 10, in an unwritable manner. The RAM 106 is a volatile storage medium such as a synchronous dynamic random access memory (SDRAM). The RAM 106 functions as a work area of the CPU 101. More specifically, the RAM 106 functions as a buffer or the like that temporarily stores various variables, parameters, and the like that are used by the recognition apparatus 10.

The storage 107 is a rewritable recording device such as a semiconductor storage medium including a flash memory, and a magnetically or optically-recordable storage medium. The storage 107 stores programs and various types of setting information that are used for the control of the recognition apparatus 10. In addition, the storage 107 stores information stored in the pattern recognition model storage 24, the search model storage 30, and the like.

The communication device 108 communicates with an external device to be used for the output or the like of an output symbol or the like. When pattern recognition of a prerecorded speech signal or a speech signal input from the microphone 104 is performed, and when an output symbol or the like is output to the display 103 or the storage 107, the recognition apparatus 10 needs not include the communication device 108.

In addition, pattern recognition of a handwritten character is performed, the recognition apparatus 10 further includes a handwriting input device. In addition, when OCR is performed, the recognition apparatus 10 further includes a scanner, a camera, or the like. In addition, when gesture recognition, recognition of a hand signal, or sign-language recognition is performed, the recognition apparatus 10 further includes a video camera for inputting a moving image signal. When pattern recognition of any of these types that does not use voice is performed, the recognition apparatus 10 needs not include the microphone 104.

Programs executed by the recognition apparatus 10 according to the present embodiment are provided with being recorded on a computer-readable recording medium such as a CD-ROM, a flexible disk (FD), a CD-R, and a digital versatile disk (DVD), in files having an installable format or an executable format.

In addition, programs executed by the recognition apparatus 10 according to the present embodiment may be stored in a computer connected to a network such as the Internet, and provided by being downloaded via the network. In addition, programs executed by the recognition apparatus 10 according to the present embodiment may be provided or delivered via a network such as the Internet. In addition, programs executed by the recognition apparatus 10 according to the present embodiment may be provided with being preinstalled on a ROM or the like.

Programs executed by the recognition apparatus 10 according to the present embodiment have a module configuration including a feature extraction module, a score calculation module, a filtering module, and a searching module. By the CPU 101 (processor) reading the programs from a storage medium or the like and executing the programs, the above-described units are loaded onto a main storage device, and the feature extractor 22, the score calculator 26, the filtering unit 28, and the searching unit 32 are generated on the main storage device. In addition, a part or all of the feature extractor 22, the score calculator 26, the filtering unit 28, and the searching unit 32 may be formed by hardware.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A recognition apparatus for performing pattern recognition of an input signal being a recognition target, the recognition apparatus comprising:
one or more hardware processors configured to:
calculate, based on the input signal, a score vector sequence in which a plurality of score vectors each including respective scores of symbols are arranged; and
cause a partial score vector of the calculated score vector sequence to pass through to filter the score vector sequence, wherein the one or more hardware processors are configured to cause, among:
a first score vector in which a representative symbol is a recognition-target symbol, the representative symbol being a symbol corresponding to a best score among the scores included in the first score vector;
a second score vector in which a representative symbol is a non-target symbol, and a score of the representative symbol is worse than a first threshold, the non-target symbol being a symbol representing that it is undetermined which piece of information among information pieces represented by recognition-target symbols is included in the input signal; and
a third score vector in which a representative symbol is a non-target symbol, and a score of the representative symbol is equal to the first threshold or better than the first threshold,
a third score vector satisfying a predefined first condition, to pass through to filter the score vector sequence.

2. The apparatus according to claim 1, wherein the one or more processors are configured to delete, among the third score vector, a third score vector not satisfying the predefined first condition to filter the score vector sequence.

3. The apparatus according to claim 1, wherein the one or more processors are further configured to generate a pattern recognition result of the input signal by searching for a symbol path following likely scores in the filtered score vector sequence.

4. The apparatus according to claim 3, wherein the one or more processors are configured to merge recognition-target symbols that are identical and consecutively arranged on a path, into one to generate the pattern recognition result of the input signal.

5. The apparatus according to claim 4, wherein the one or more processors are configured to merge the recognition-target symbols that are identical and consecutively arranged on the path, into one, and then, exclude the non-target symbol on the path to generate the pattern recognition result of the input signal.

6. The apparatus according to claim 1, wherein the one or more processors are configured to determine one or more and K−1 or less third score vectors of consecutive K (K is an integer of two or more) third score vectors as the third score vector satisfying the predefined first condition.

7. The apparatus according to claim 6, wherein the one or more processors are configured to determine one third score vector of the consecutive K (K is an integer of two or more) third score vectors as the third score vector satisfying the predefined first condition.

8. The apparatus according to claim 1, wherein, when a representative symbol included in an immediately preceding score vector of a partial vector sequence constituted by consecutive K (K is an integer of two or more) third score vectors, and a representative symbol included in an immediately following score vector of the partial vector sequence are identical, the one or more processors are configured to determine one or more and K−1 or less third score vectors of the partial vector sequence as the third score vector satisfying the predefined first condition.

9. The apparatus according to claim 1, wherein, when a set of symbols having top $k_p$ ($k_p$ is an integer of one or more) scores that are included in an immediately preceding score vector of a partial vector sequence constituted by consecutive K (K is an integer of two or more) third score vectors, and a set of symbols having top $k_p$ scores that are included in an immediately following score vector of the partial vector sequence are identical, the one or more processors are configured to determine one or more and K−1 or less third score vectors of the partial vector sequence as the third score vector satisfying the predefined first condition.

10. The apparatus according to claim 1, wherein, when at least any one of symbols having top $k_p$ ($k_p$ is an integer of one or more) scores that are included in an immediately preceding score vector of a partial vector sequence constituted by consecutive K (K is an integer of two or more) third score vectors is identical to any one of symbols having top $k_n$ ($k_n$ is an integer of one or more) scores that are included in an immediately following score vector of the partial vector sequence, the one or more processors are configured to determine one or more and K−1 or less third score vectors of the partial vector sequence as the third score vector satisfying the predefined first condition.

11. The apparatus according to claim 1, wherein the one or more processors are configured to calculate the score vectors using a recurrent neural network.

12. The apparatus according to claim 11, wherein the one or more processors are configured to calculate a softmax function for outputting the respective scores of the symbols in an output layer of the recurrent neural network.

13. The apparatus according to claim 1, wherein the input signal is a speech signal.

14. A recognition method for performing pattern recognition of an input signal being a recognition target, the recognition method comprising:
   calculating, based on the input signal, a score vector sequence in which a plurality of score vectors each including respective scores of symbols are arranged; and
   causing a partial score vector of the calculated score vector sequence to pass through to filter the score vector sequence,
   wherein at the causing, among:
   a first score vector in which a representative symbol is a recognition-target symbol, the representative symbol being a symbol corresponding to a best score among the scores included in the first score vector;
   a second score vector in which a representative symbol is a non-target symbol, and a score of the representative symbol is worse than a first threshold, the non-target symbol being a symbol representing that it is undetermined which piece of information among information pieces represented by recognition-target symbols is included in the input signal; and
   a third score vector in which a representative symbol is a non-target symbol, and a score of the representative symbol is equal to the first threshold or better than the first threshold,
   a third score vector satisfying a predefined first condition is made to pass through to filter the score vector sequence.

15. A computer program product comprising a non-transitory computer-readable medium including programmed instructions, the instructions causing a computer to function as a recognition apparatus for performing pattern recognition of an input signal being a recognition target, the instructions causing the computer to function as:
   a calculator configured to calculate, based on the input signal, a score vector sequence in which a plurality of score vectors each including respective scores of symbols are arranged; and
   a filtering unit configured to cause a partial score vector of the calculated score vector sequence to pass through,
   wherein the filtering unit causes, among:
   a first score vector in which a representative symbol is a recognition-target symbol, the representative symbol being a symbol corresponding to a best score among the scores included in the first score vector;
   a second score vector in which a representative symbol is a non-target symbol, and a score of the representative symbol is worse than a first threshold, the non-target symbol being a symbol representing that it is undetermined which piece of information among information pieces represented by recognition-target symbols is included in the input signal; and
   a third score vector in which a representative symbol is a non-target symbol, and a score of the representative symbol is equal to the first threshold or better than the first threshold,
   a third score vector satisfying a predefined first condition, to pass through.

* * * * *